(12) United States Patent
Jones et al.

(10) Patent No.: US 12,141,734 B2
(45) Date of Patent: Nov. 12, 2024

(54) SYSTEM AND METHOD FOR AUTOMATED LABORATORY INVENTORY MANAGEMENT USING RFID TECHNOLOGY

(71) Applicant: Abbott Laboratories, Abbott Park, IL (US)

(72) Inventors: John Curtis Jones, Grapevine, TX (US); Patrick P. Fritchie, Southlake, TX (US); Steve Kotlinski, Hawthorn Woods, IL (US); Jay Brian Sailer, Trevor, WI (US); Pathik H. Soni, Waukesha, WI (US); Erich Iwen, Pleasant Prairie, WI (US); Ronald R. Hohs, Kenosha, WI (US); William B. Williams, Coppell, TX (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 18/322,317

(22) Filed: May 23, 2023

(65) Prior Publication Data

US 2023/0297932 A1    Sep. 21, 2023

Related U.S. Application Data

(63) Continuation of application No. 17/093,919, filed on Nov. 10, 2020, now Pat. No. 11,694,146, which is a
(Continued)

(51) Int. Cl.
*G06Q 30/00*    (2023.01)
*G01N 35/00*    (2006.01)
(Continued)

(52) U.S. Cl.
CPC ....... *G06Q 10/08* (2013.01); *G01N 35/00663* (2013.01); *G06Q 10/087* (2013.01); *G06Q 50/22* (2013.01); *G01N 2035/00881* (2013.01)

(58) Field of Classification Search
CPC ...... G06Q 10/08; G06Q 10/087; G06Q 50/22; G01N 35/00663; G01N 2035/00881
See application file for complete search history.

(56) References Cited

U.S. PATENT DOCUMENTS 6,032,130 A    2/2000   Alloul
6,204,763 B1   3/2001   Sone
(Continued)

FOREIGN PATENT DOCUMENTS

CN    1479908 A    3/2004
CN    101484911 A   7/2009
(Continued)

OTHER PUBLICATIONS

"Pharmacy power via technology," Chain Drug Review27.2: 29(4). Racher Press, Inc. (Jan. 31, 2005); Dialog #127935801, 6pgs. (Year: 2005).*

(Continued)

*Primary Examiner* — Robert M Pond
(74) *Attorney, Agent, or Firm* — HANLEY, FLIGHT & ZIMMERMAN, LLC

(57) ABSTRACT

In one aspect, a computer readable memory medium comprising program instructions for graphically developing a connectivity driver is provided. The computer readable memory medium is a non-transitory medium. The program instructions are executable by a processor to generate a purchase order for a laboratory item, transmit the purchase order to a remote computer in order to communicate the purchase order to a vendor, receive an advance shipping notice generated in response to the purchase order, receive item information stored in an RFID tag of a tagged item received at the delivery location, and check the item information against the advance shipping notice in order to verify
(Continued)

that the tagged item is the same as the ordered laboratory item. The purchase order specifies a delivery location.

19 Claims, 6 Drawing Sheets

Related U.S. Application Data continuation of application No. 13/326,034, filed on Dec. 14, 2011, now Pat. No. 10,867,274.

(51) Int. Cl.
  *G06Q 10/08* (2023.01)
  *G06Q 10/087* (2023.01)
  *G06Q 50/22* (2018.01)

(56) References Cited

U.S. PATENT DOCUMENTS

| | | | |
|---|---|---|---|
| 6,600,418 | B2 | 7/2003 | Francis |
| 7,639,136 | B1 | 12/2009 | Wass |
| 8,318,499 | B2 | 11/2012 | Fritchie |
| 8,593,283 | B2 | 11/2013 | Smith |
| 8,872,634 | B2 | 10/2014 | Hansen |
| 10,837,974 | B2 | 11/2020 | Postma |
| 10,867,274 | B2 | 12/2020 | Jones et al. |
| 11,694,146 | B2 | 7/2023 | Jones et al. |
| 2002/0070862 | A1 | 6/2002 | Francis |
| 2004/0100380 | A1 | 5/2004 | Lindsay |
| 2004/0100390 | A1 | 5/2004 | Giraldin |
| 2005/0149356 | A1* | 7/2005 | Cyr .................. G06Q 10/087 705/2 |
| 2005/0159982 | A1 | 7/2005 | Showalter |
| 2006/0055530 | A1* | 3/2006 | Wang ................ G01S 5/0018 340/8.1 |
| 2006/0187003 | A1* | 8/2006 | Terenna .............. G04G 11/00 368/244 |
| 2006/0253343 | A1 | 11/2006 | Gregersen |
| 2009/0195361 | A1 | 8/2009 | Smith |
| 2009/0267765 | A1 | 10/2009 | Greene |
| 2010/0141457 | A1 | 6/2010 | Wass |
| 2010/0324722 | A1 | 12/2010 | Fritchie |
| 2011/0246215 | A1* | 10/2011 | Postma .............. G16H 10/40 705/28 |
| 2012/0101956 | A1 | 4/2012 | Hyre |
| 2012/0223817 | A1 | 9/2012 | Hansen |
| 2013/0159135 | A1 | 6/2013 | Jones et al. |
| 2021/0142261 | A1 | 5/2021 | Jones et al. |

FOREIGN PATENT DOCUMENTS

| | | |
|---|---|---|
| CN | 101571908 A | 11/2009 |
| CN | 102207993 A | 10/2011 |
| CN | 104106086 A | 10/2014 |
| CN | 110223021 A | 9/2019 |
| EP | 2791840 A4 | 7/2015 |
| EP | 3832569 A1 | 6/2021 |
| WO | 2013090531 A1 | 6/2013 |

OTHER PUBLICATIONS

RFID labelling for laboratories, Csols-Admin, Dec. 19, 2011, https://www/csols.com/wordpress/rfid-labelling-for-laboratories/ (Year:2011).

International Searching Authority, International Search Report and Written Opinion for PCT/US2012/69434, dated Dec. 13, 2012, 7 Pages.

International Search Report of PCT/US2012/069434, Mailed on Feb. 20, 2013, 5 Pages.

International Searching Authority, "Written Opinion of the International Searching Authority," issued in connection with International Application No. PCT/US2012/069434, mailed on Feb. 20, 2013, 5 Pages.

International Searching Authority, "International Preliminary Report on Patentability," issued in connection with international Application No. PCT/US2012/069434, mailed on Jun. 17, 2014, 6 Pages.

United States Patent & Trademark Office, "Non-Final Office Action," issued in connection with U.S. Appl. No. 13/326,034, mailed on Dec. 3, 2014, 18 Pages.

United States Patent & Trademark Office, "Final Office Action," issued in connection with U.S. Appl. No. 13/326,034, mailed on May 6, 2015, 19 Pages.

Extended European Search Report for EP12857654.3, mailed Jun. 15, 2015, 7 pages.

United States Patent & Trademark Office, "Non-Final Office Action," issued in connection with U.S. Appl. No. 13/326,034, mailed on Oct. 1, 2015, 21 Pages.

United States Patent & Trademark Office, "Final Office Action," issued in connection with U.S. Appl. No. 13/326,034, mailed on Feb. 22, 2016, 27 Pages.

International Searching Authority, "International Search Report," Issued in connection with Application No. 2012800692976, mailed on Jul. 16, 2016. 2 Pages.

The State Intellectual Property Office of People's Republic of China, "The First Office Action," Issued in connection with Chinese Patent Application No. 201280069297.6, dated Aug. 3, 2016, 25 Pages.

The State Intellectual Property Office of People's Republic of China, "The Second Office Action," issued in connection with Chinese Patent Application No. 201280069297.6, dated Mar. 9, 2017, 31 Pages.

European Communication for corresponding European Patent Application No. 12 857 654.3 dated Apr. 18, 2018, 7 pages.

United States Patent & Trademark Office, "Decision on Appeal," issued in connection with U.S. Appl. No. 13/326,034, mailed on Jun. 20, 2018, 11 Pages.

United States Patent & Trademark Office, "Non-Final Office Action," issued in connection with U.S. Appl. No. 13/326,034, mailed on Jan. 3, 2019, 14 Pages.

United States Patent & Trademark Office, "Final Office Action," issued in connection with U.S. Appl. No. 13/326,034, mailed on Apr. 24, 2019, 11 Pages.

United States Patent & Trademark Office, "Non-Final Office Action," issued in connection with U.S. Appl. No. 13/326,034, mailed on Dec. 19, 2019, 13 Pages.

United States Patent & Trademark Office, "Final Office Action," issued in connection with U.S. Appl. No. 13/326,034, mailed on Jun. 2, 2020, 8 Pages.

United States Patent & Trademark Office, "Notice of Allowance and Fees Due," issued in connection with U.S. Appl. No. 13/326,034, mailed on Aug. 31, 2020, 8 Pages.

European Search Report of EP20197893.9 Dated May 11, 2021, 2 Pages.

United States Patent & Trademark Office, "Non-Final Office Action," issued in connection with U.S. Appl. No. 17/093,919, mailed on Jan. 25, 2022, 13 Pages.

United States Patent & Trademark Office, "Final Office Action," issued in connection with U.S. Appl. No. 17/093,919, mailed on Oct. 18, 2022, 13 Pages.

United States Patent & Trademark Office, "Notice of Allowance and Fees Due," issued in connection with U.S. Appl. No. 17/093,919, mailed on Nov. 1, 2022, 9 Pages.

United States Patent & Trademark Office, "Notice of Allowance and Fees Due," issued in connection with U.S. Appl. No. 17/093,919, mailed on Feb. 21, 2023, 14 Pages.

China National Intellectual Property Administration, "First Office Action" issued in connection with Application No. 201910503519. 4, dated Dec. 5, 2022, 18 pages.

China National Intellectual Property Administration, "Second Office Action" issued in connection with Application No. 201910503519. 4, dated Aug. 30, 2023, 22 pages.

The State Intellectual Property of People's Republic of China, "Rejection Decision," issued in Connection with Chinese Patent

(56) References Cited

OTHER PUBLICATIONS

Application No. 201910503519.4, dated Dec. 19, 2023, 17 Pages. [English translation included].

\* cited by examiner

SYSTEM AND METHOD FOR AUTOMATED LABORATORY INVENTORY MANAGEMENT USING RFID TECHNOLOGY

CROSS-REFERENCE TO RELATED APPLICATIONS

This patent application is a Continuation of U.S. patent application Ser. No. 17/093,919, filed Nov. 10, 2020, which is a Continuation of U.S. patent application Ser. No. 13/326,034 (now U.S. Pat. No. 10,867,274), filed Dec. 14, 2011, both of which are incorporated by reference in their entireties.

BACKGROUND

Managing inventory in a laboratory, such as a diagnostic laboratory, a forensics laboratory, a clinical laboratory, or a blood bank is often a time consuming activity that requires several laborious manual steps. Diagnostics laboratories having instruments which perform any kind of medical test used to aid in the diagnosis or detection of disease. Forensics laboratories use instruments which apply a broad spectrum of sciences to perform tests used to answer questions of interest to a legal system. Blood banks also have instruments which may perform various tests on blood samples. The activities for managing inventory in a laboratory cover a multiplicity of actions ranging from receipt of materials to stocking to retrieving to reordering product.

Typically, when a product shipment contained in a shipping carton arrives at a laboratory, the shipping carton is opened and items within the shipping carton are removed and physically reconciled against a shipping invoice or a packing list. In addition, some form of laboratory inventory management may require updating to enable laboratory personnel to monitor a lifecycle of an item previously contained within the shipping carton and currently used within the laboratory. The laboratory's inventory management process may consist of a simple handwritten list, an Excel spreadsheet or even a computer application that utilizes an item identifying mark, such as a serial number or barcode, associated with each item to monitor inventory. Even when using a computer application along with item barcodes to provide for a laboratory's inventory management, laboratory personnel are often still required to manually enter additional data (e.g., expiration dates, lot numbers, etc.) into the computer application, to print supplementary barcode labels, and to apply the supplementary barcode labels to the items.

Organizing and monitoring stock locations for the numerous items received by and utilized within a laboratory is often a challenge in itself, regardless of the process or system that is utilized. The actual inventory management and product reordering process may also be partially automated by utilizing various software applications. Nevertheless, several elements may still require human interaction, which may not only be tedious by nature, but could be wrought with error.

Additionally, throughout the course of normal usage of an item, laboratory personnel typically follow a "checking out" process whenever an item is used or discarded. The checking out process may be problematic for some labs as the process often involves considerable human interaction. Some of the human interaction may be prone to human error, and other human interaction might not be followed exactly as required by the laboratory personnel, both of which can affect the accuracy of inventory levels within the laboratory. In order to reconcile any discrepant inventory levels, the laboratory may need to perform a labor-intensive demand or physical inventory, multiple times throughout the year.

Another shortcoming of current laboratory inventory management processes is that visibility into a supply chain is often restricted to just the laboratory. The amount of information being communicated between the end user and the supplier is usually limited to: purchase orders sent over the phone, through email or by fax; a shipping list that arrives with the product; and an invoice.

Furthermore, many laboratories utilize a Laboratory Information Management System or Laboratory Integration Management Solution (LIMS) software system which often is not integrated with or compatible with the computer application utilized in assisting with the laboratory's inventory management process. A LIMS is a software system used in laboratories for the integration of laboratory software and instruments and the management of samples, laboratory users, standards and other laboratory functions such as Quality Assurance (QA) and Quality Control (QC), sample planning, invoicing, plate management, and workflow automation. LIMS implementations may also support information gathering, decision making, calculation, review and release into the workplace and away from the office. More recently, LIMS products are starting to expand into Electronic Laboratory Notebooks, assay data management, data mining and data analysis.

Modern LIMS have implemented extensive configurability as each laboratory's needs for tracking additional data points can vary widely. LIMS vendors often cannot make assumptions about what these data tracking needs are and therefore need to be adaptable to each environment. LIMS users may also have regulatory concerns to comply with such as CLIA, HIPAA, GLP and FDA specifications and this can affect certain aspects of sample management in a LIMS solution. One key to compliance with many of these standards is audit logging of all changes to LIMS data, and in some cases a full electronic signature system is required for rigorous tracking of field level changes to LIMS data.

It would be desirable to provide a simplified method for automated inventory management within a laboratory which reduces the amount of human interaction required to manage and track the inventory of items within a laboratory. It would also be desirable to provide a LIMS software which has an integrated laboratory inventory management application.

SUMMARY

In one aspect, a method for automated laboratory inventory management is provided. The method includes, but is not limited to receiving on a local computer a product catalogue from a remote computer detailing a laboratory item and generating a purchase order for the laboratory item using the local computer. The purchase order specifies a delivery location. The method also includes, but is not limited to, transmitting the purchase order to the remote computer in order to communicate the purchase order to a vendor, receiving on the local computer an advance shipping notice generated in response to the purchase order, receiving a tagged item at a laboratory associated with the delivery location, and passing the tagged item through a receiving portal located at an entryway of the laboratory. The tagged item includes an RFID tag. The receiving portal retrieves item information stored in the RFID tag. The method also includes, but is not limited to, transmitting the item information to the local computer and checking the item information against the advance shipping notice in order to verify that the tagged item is the same as the ordered laboratory item.

In one aspect, a computer readable memory medium comprising program instructions for graphically developing a connectivity driver is provided. The computer readable memory medium is a non-transitory medium. The program instructions are executable by a processor to generate a purchase order for a laboratory item, transmit the purchase order to a remote computer in order to communicate the purchase order to a vendor, receive an advance shipping notice generated in response to the purchase order, receive item information stored in an RFID tag of a tagged item received at the delivery location, and check the item information against the advance shipping notice in order to verify that the tagged item is the same as the ordered laboratory item. The purchase order specifies a delivery location.

In one aspect, a laboratory information management system for management of samples, laboratory users, standards and other laboratory functions, is provided. The system includes, but is not limited to, a computer readable memory medium and at least one processor operable to access from the computer readable memory medium program instructions. The computer readable memory medium program instructions are executable by the processor to monitor an inventory database in order to determine how many laboratory items of a particular kind are in a laboratory, generate a purchase requisition when an amount of laboratory items of a particular kind drops below a predetermined level in order to notify laboratory personnel that a purchase order needs to be generated for more laboratory items of a particular kind, generate a purchase order for more laboratory items of a particular kind, transmit the purchase order to a remote computer in order to communicate the purchase order to a vendor, and receive an advance shipping notice generated in response to the purchase order. At least some of the laboratory items of a particular kind are tagged laboratory items having an RFID tag. The computer readable memory medium program instructions are also executable by the processor to receive item information stored in an RFID tag of a tagged item received at the delivery location and check the item information against the advance shipping notice in order to verify that the tagged item is the same as the ordered laboratory item.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by providing a user with an automated laboratory inventory management system that can assist to generate shipping orders, track items from the time of shipment to the time of arrival within a laboratory and through the time of disposal within a laboratory, and automatically enter information about the item in a database for later use and for inventory management, the amount of human interaction required to manage the inventory of items within a laboratory may be reduced. Additionally, by integrating a laboratory inventory management application within a LIMS software, LIMS information internal to the LIMS software may be shared with inventory information internal to the laboratory inventory management application in order to further reduce the amount of human interaction required to manage and track the inventory of items within a laboratory.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
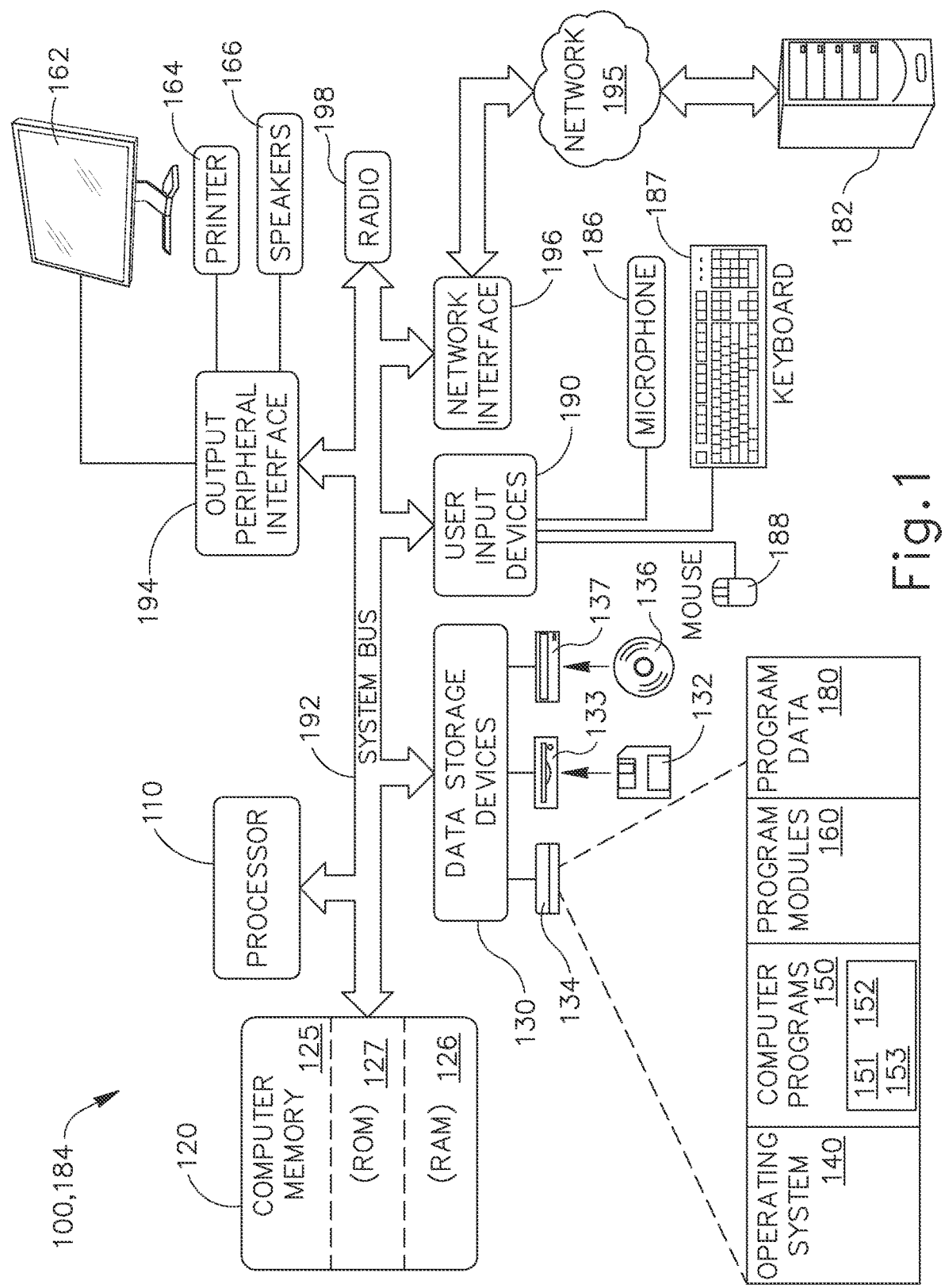
FIG. 1 depicts a block schematic diagram of an exemplary computing system, in accordance with one embodiment of the present invention.

With reference to FIG. 1, depicted is an exemplary computing system for implementing embodiments. FIG. 1 includes computer 100 running a computer program 150. Computer 100 is a programmable machine designed to sequentially and automatically carry out a sequence of arithmetic or logical operations. Computer 100 may be portable or handheld, such as with a personal digital assistant (PDA), a smartphone, or any a portable electronic device. Computer 100 may be local, that is, at the same location, site, or building as, or within reach of, a particular user, and therefore is known as a local computer 184, as shown in FIG. 1. Computer 100 may also be remote, that is, not at the same location, site, or building as, or not within reach of, a particular user. If the computer 100 is remote, such as with a remote computer 182, the computer 100 may be accessed via a computer 100 which is local, such as the local computer 184.

In order to carry out these operations, the computer 100 includes a processor 110 in communication with a computer readable memory medium 120. Computer readable memory medium 120 is any medium which can be used to store information which can later be accessed by processor 110. Computer readable memory medium 120 includes computer memory 125 and data storage devices 130. Computer memory 125 is preferably a fast-access memory and is used to run program instructions executable by the processor 110. Computer memory 125 includes random access memory (RAM) 126, flash memory, and read only memory (ROM) 127.

Data storage devices 130 and their associated computer readable memory medium provide storage of computer readable instructions, data structures, program modules and other data for the computer 100. Data storage devices 130 include magnetic medium like a floppy disk 132 which are read by a floppy disk drive 133, a hard disk drive 134, and magnetic tape; optical medium 136 like a Compact Disc (CD), a Digital Video Disk (DVD), and a Blu-ray Disc which are read by an optical disk drive 137; and solid state memory such as random access memory (RAM), flash memory, and read only memory (ROM).

Data storage devices 130 are preferably physical devices and are used to store any information or program which may be accessed by the processor 110, such as an operating system 140, a computer program 150, a program module 160 which may runs as a part of computer program 150, and program data 180. Any computer program 150 may be a standalone application or a program module 160 which runs as part of a computer program 150.

Computer program 150 may include specific types of computer programs or applications such as a LIMS software application 151, a laboratory information system (LIS) software application 152, or a laboratory inventory management application 153. The LIMS software 151 is a software system used in laboratories for the integration of laboratory software and instruments and the management of samples, laboratory users, standards and other laboratory functions such as Quality Assurance (QA) and Quality Control (QC), sample planning, invoicing, plate management, inventory management, and workflow automation. The LIS software application 152 is a class of software that receives, processes, and stores information generated by medical laboratory processes. The LIS software application 152 often must interface with instruments and other information systems such as hospital information systems (HIS). The LIS software application 152 is a highly configurable application which is customized to facilitate a wide variety of laboratory workflow models. The laboratory inventory management application 153 is a piece of software that helps to manage and track the inventory of items within a laboratory.

Computer 100 further includes input devices 190 through which data may enter the computer 100, either automatically or by a user who enters commands and data. Input devices 190 can include: an electronic digitizer or drawing board; a barcode reader, an RFID reader, a debit card reader, or any near-field communication (NFC) reader; a microphone 186; an image capture device such as a camera, a video camera, or a digital flatbed or sheet-fed scanner; a keyboard 187, a numeric pin pad, any device which has a series of depressible keys; a pointing device 188, such as a mouse, a trackball or a touch pad; any USB device, any Bluetooth™ enabled device, or any networked device able to generate and transmit a signal. Other input devices 190 may include a joystick, game pad, satellite dish, an instrument, a sensor, and the like. In one or more embodiments, input devices 190 are any devices that can direct display or instantiation of computer programs 150 running on processor 110 and computer 100.

These and other input devices 190 can be connected to processor 110 through a user input interface that is coupled to a system bus 192, but may be connected by other interface and bus structures, such as a parallel port, game port or a universal serial bus (USB). Computer 100 may also include other peripheral output devices such as speakers 166, printers 164, and/or display devices 162, which may be connected to the processor 110 through an output peripheral interface 194 that is coupled to the system bus 192, but may be connected by other interface and bus structures, such as a parallel port, game port or a universal serial bus (USB).

Computer 100 may include a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards. Radio 198 may be connected to the processor 110 through an interface that is coupled to a system bus 192, but may be connected by other interface and bus structures, such as a parallel port, game port or a universal serial bus (USB).

Computer 100 may include a network interface device 196 for connecting the computer 100 to a network 195. The network interface device 196 uses a common protocol allowing computer 100 to communicate with other remote computers 182 which are all connected to the network 195. The network interface device includes a network adapter, such as a wireless network adapter or a wired network adapter, a modem; or any device which can interface with a network 195. The network interface device 196 may be connected to the processor 110 through a network interface that is coupled to a system bus 192, but may be connected by other interface and bus structures, such as a parallel port, game port or a universal serial bus (USB).

The network 195 allows the computer 100 to operate in a networked environment having logical connections between computer 100 and one or more remote computers 182. The remote computer 182 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer 182 may comprise the destination machine. Note, however, that source and destination machines need not be connected by a network 195 or any other means, but instead, data may be migrated via any media capable of being written by the source platform and read by the destination platform or platforms. When using a Local Area Network (LAN) or a Wireless Local Area Network (WLAN) networking environment, network 195 connects the computer 100 with the remote computer 182 via a network adapter. When used in a Wide Area Network (WAN) networking environment, computer 100 may include a modem or other means for establishing communications over the WAN, such as radio 198, to another remote computer 182. It will be appreciated that other means of establishing a communications link between computer 100 and other remote computers 182 may be used.

In one embodiment, computer 100 is in communication with remote computer 182, and portions of the computer program 150 are run on the remote computer 182 and/or the computer 100. In this embodiment, the computer program 150 receives commands and information from the computer 100 being input via user input device 190. Information received from the computer 100 may then be relayed to the remote computer 182. Additionally information generated by the computer program 150 running on the remote computer 182 and/or the computer 100 may be displayed on the display 162 connected with the computer 100.

Figure 2:
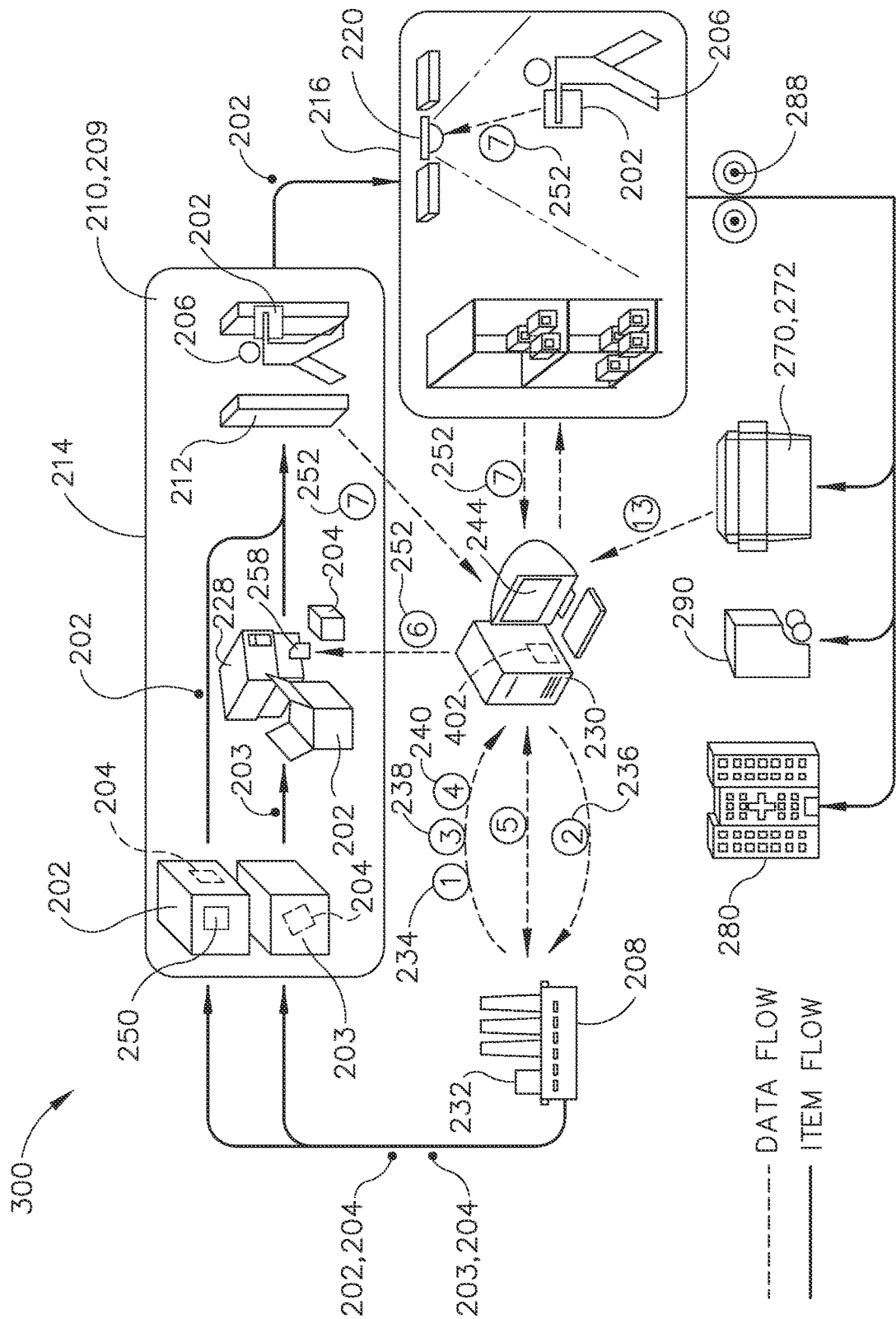
FIG. 2 depicts a block schematic diagram of a system for automated inventory management of items within a site, in accordance with one embodiment of the present invention.
Figure 3:
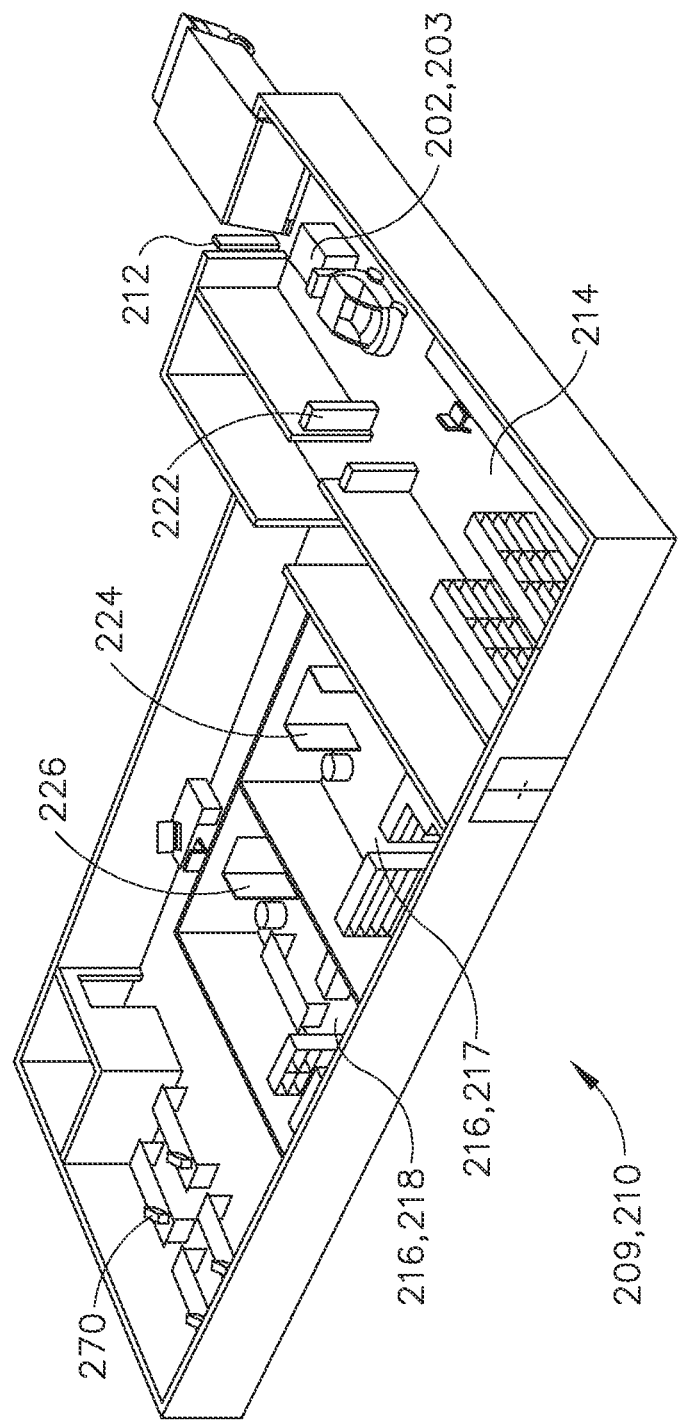
FIG. 3 depicts a perspective view of a site for storing items, in accordance with one embodiment of the present invention.
Figure 4:
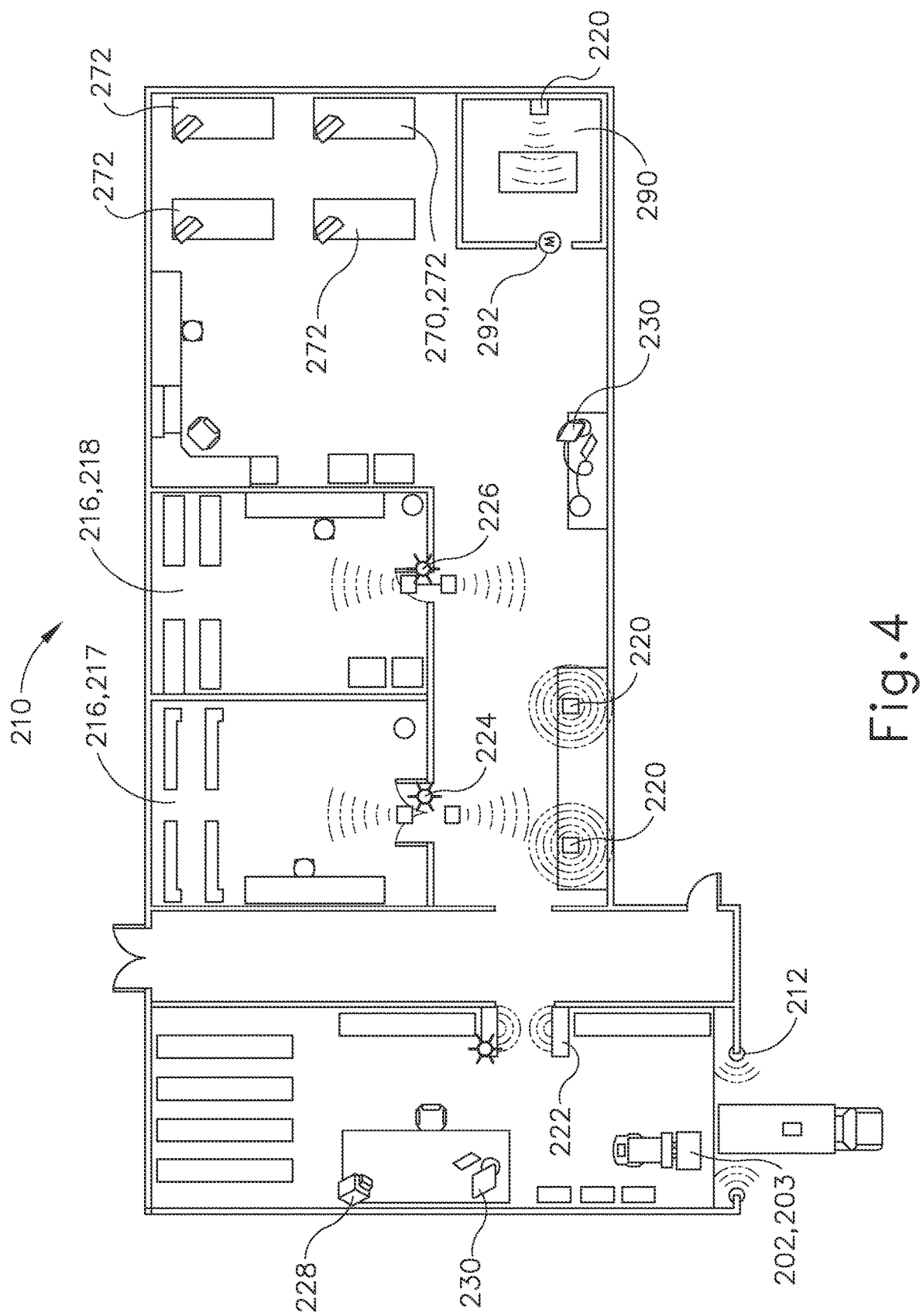
FIG. 4 depicts a top schematic view of a site for storing items, in accordance with one embodiment of the present invention.
Figure 5:
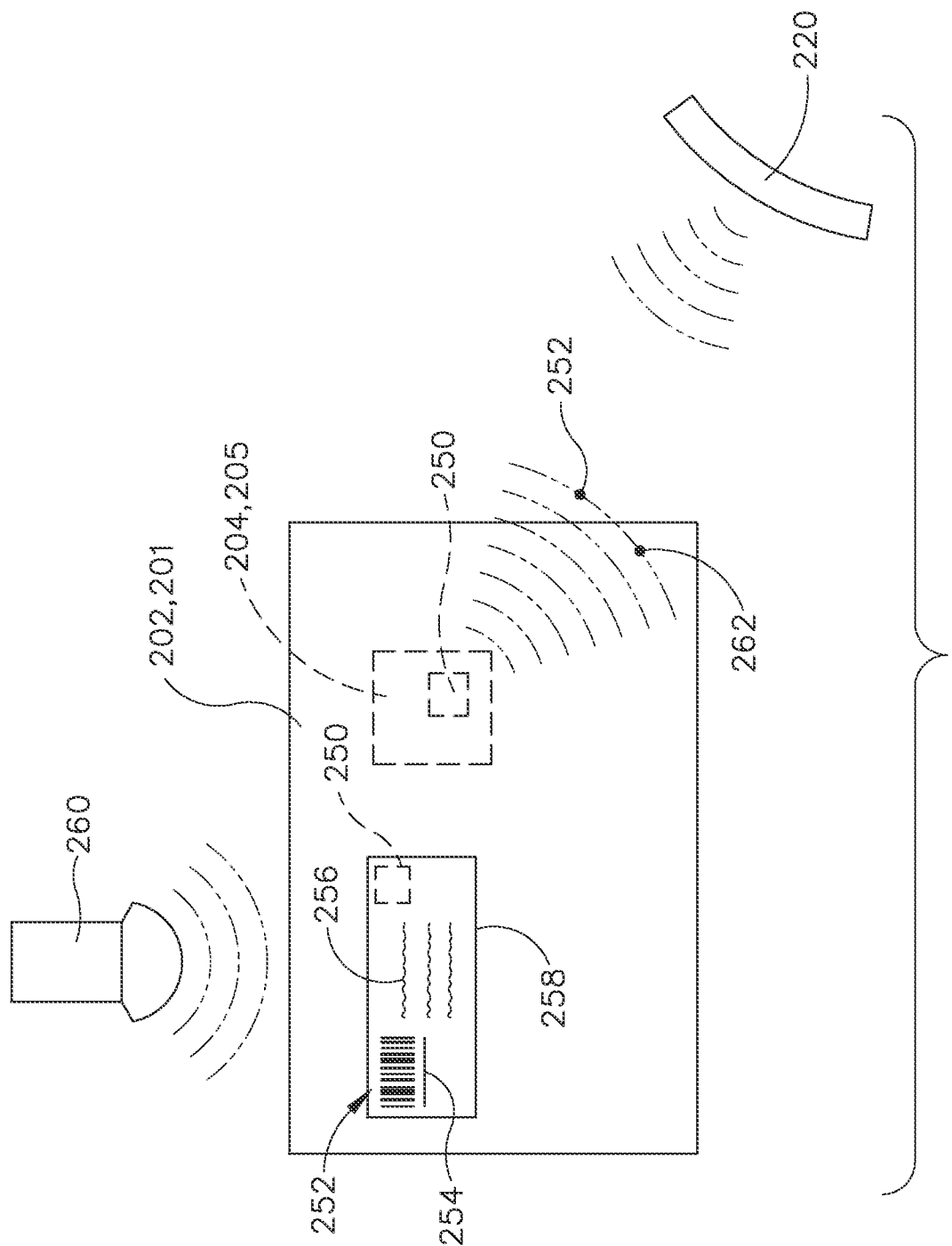
FIG. 5 depicts a tagged shipping carton having an item, in accordance with one embodiment of the present invention.

With reference to FIG. 2, a system 300 is provided for automated inventory management of items 204 within a site 209. Items 204 include any item which may need to be ordered or re-ordered within a site 209. Items 204 preferably include medical items such as laboratory items and hospital items. Laboratory items are items 204 which are found in a laboratory such as: consumables including reagents, assays, calibrators, and controls; laboratory instrument parts and supplies such as replacement kits, spare parts, and peripheral devices. Medical items may include items 204 which are found in a hospital, a clinic, or a medical laboratory, such as pharmaceuticals, instruments, instrument parts, health products such as baby food, nutritional supplements ointments, and home remedy or diagnostic devices. Site 209 includes any facility in which items 204 are needed, such as a hospital, a laboratory 210, and a clinic. Laboratory 210 includes any facility that provides controlled conditions in which scientific research, experiments, and measurement may be performed, preferably by laboratory instruments 270. Laboratory 210 includes facilities such as hematology labs, hospital laboratories, chemical laboratories, biological laboratories, analytical laboratories, blood banks, and a medical or clinical laboratory which deals with and processes samples or specimens. Site 209 maintains computer 100, such as local computer 184, which runs computer program 150. The local computer 184 is located near or on the site 209 and accessible by laboratory personnel 206.

If a particular item 204, such as a certain type of chemical assay, is needed the item 204 is ordered by generating a purchase order 236. The purchase order 236 may be automatically generated by the computer program 150 or manually generated by the laboratory personnel 206, preferably upon receiving notice from the computer program 150 than an amount of item 204 is below a predetermined number. Preferably, before the item 204 is ordered, a product catalogue 234 is received from a remote computer 182 at a vender's warehouse 208 detailing the item 204. The product catalogue 234 provides details about the item 204, such as a description of the item 204, a price of the item 204, a name of the item 204, a model number or part number for the item 204, and other such information. The product catalogue 234 may be transmitted digitally to the computer program 150 on local computer 184 from remote computer 182. Upon receiving the product catalogue 234, the computer program 150 may access the product catalogue 234 or display the contents of the product catalogue 234 on a display connected with the computer 100. Upon receiving the product catalogue 234, the laboratory personnel 206 may then search through the catalogue 234 to find and retrieve details about the item 204. In one embodiment, the computer program 150 automatically searches through the product catalogue 234 to find and retrieve details about the item 204.

Upon finding and retrieving details about the item 204, a purchase order 236 is generated by the laboratory personnel 206 or the computer program 150 for the item 204, preferably using the details found in the product catalogue 234. Preferably, the purchase order 236 specifies the model number of the item 204, the quantity of item 204 to be delivered, and a delivery location at which the item 204 is to be delivered from the vender's warehouse 208. The purchase order 236 may also specify a desired delivery date, desired lots, discount codes or contract prices, buyer information, and preferred shipping methods. Upon generating the purchase order 236, the purchase order 236 is then approved, either manually by the laboratory personnel 206 or automatically by the computer program 150.

In one embodiment, as site 209 uses items 204, the inventory of the item 204 is tracked, preferably by laboratory personnel 206 in combination with the computer program 150. Preferably, the inventory of all items 204 is tracked and accessed by computer program 150. For example, the laboratory personnel 206 may use active bar code or radio frequency identification (RFID) readers 260 to actively scan bar coded or RFID tags 250 from items 204 or the packaging/shipping cartons 202 in which the items 204 are shipped in. Additionally, RFID portals 212, 222, 224, 226 may be used to passively scan RFID tags 250 from the items 204 as the items 204 are passed through the RFID portals 212, 222, 224, 226. In this manner, the total number of items 204 at a site 209 may be tallied and added to the inventory tracked and accessed by computer program 150. Whenever an item 204 is used, the laboratory personnel 206 scan the item 204 with the RFID reader 260 or the item 204 is passed through a portal, such as exit portal 288, indicating that the item 204 is being disposed of. Upon using the item and scanning it with an RFID reader 260 or passing it through the exit portal 288, the item 204 is removed from the inventory that is tracked and accessed by computer program 150.

In this embodiment, if the inventory of a particular item 204 falls below a predetermined number, the computer program 150 alerts the laboratory personnel 206 that an item 204 needs to be ordered and a purchase order 236 needs to be generated. The laboratory personnel 206 may manually generate a purchase order 236, the computer program 150 may automatically generate a purchase order 236 for approval by the laboratory personnel 206, or the computer 150 automatically generates and approves a purchase order 236.

Upon approval of the purchase order 236, the purchase order 236 is then transmitted from the local computer 184 to the remote computer 182 in order to communicate the purchase order 236 to a vendor. A vendor is a manufacturer or a distributor of item 204. The vendor preferably maintains a vendor warehouse 208 which is at a remote location away from the site 209. The vendor warehouse 208 house items 204. Preferably, the vendor also maintain the remote computer 182 at a location which is remote from the site 209 and is preferably accessible by many sites 209 through a network or networked environment 195, such as the Internet.

Upon receiving the purchase order 236, the remote computer 182 notifies personnel working for the vendor of the purchase order 236, and preferably notifies personnel working within the vendor warehouse 208 of the purchase order 236. The personnel working for the vendor or within the vendor warehouse 208 searches for the ordered item 204 either manually or automatically using machinery.

Upon locating the ordered item 204, an advance shipping notice 240 is then generated in response to the purchase order 236, either manually by the personnel working for the vendor or automatically by another remote computer 232 located in the vendor warehouse 208, and then communicated to the remote computer 182. Preferably, the advance shipping notice 240 is generated upon locating and tagging the ordered and located item 204 with an RFID tag 250. Preferably, the advance shipping notice 240 indicates unique item information 252 about item 204, such as the item's serial number 254, the item's lot number 256, manufacturing date, expiration date, recommended storage temperature, contents, ingredients, part numbers, and estimated shipping date. Preferably, the advance shipping notice 240 indicates an estimated shipping date for the item 204, an amount of items 204 being shipping, a weight of the items 204, a total price for the items 204, a tracking number to track the item 204 upon being shipped, and a unique order number or order identifier. In one embodiment, the advance shipping notice 240 contains one of a globally unique product identifier, a product description, and a globally unique carton or overpack identifier, a lot number, a manufacturing date, a shipping date, a target delivery date, and a manufacturer name.

Upon generating the advance shipping notice 240, the advance shipping notice 240 is then transmitted from the remote computer 232 to the local computer 184, preferably via the remote computer 182. Then the items 204 which are being sent to the site 209, as indicated in the advance shipping notice 240, are packed inside a shipping carton 201, and preferably, inside a tagged shipping carton 202 having a RFID tag 250 associated with the shipping carton 202. The RFID tag 250 associated with the shipping carton 202 may contain information detailing or listing each item 204 located within the shipping carton 202, along with item information 252 for each item 204 in the shipping carton 202. Preferably, each item 204 is also tagged with an RFID tag 250 containing item information 252 for each item 204, forming a tagged item 205 which includes an RFID tag 250 affixed with an item 204.

Upon transmitting the advanced shipping notice 240 to the local computer 184, the advanced shipping notice 240 is received on the local computer 184 by the compute program 150. The local computer 184, and specifically the computer program 150, then tracks and stores information within the advanced shipping notice 240, such as unique item information 252, an estimated shipping date for the item 204, an amount of items 204 being shipping, a weight of the items 204, a total price for the items 204, a tracking number to track the item 204 upon being shipped, and a unique order number or order identifier. The computer program 150 then may generate a reminder for the estimated shipping date, and an expected inventory database for items 204 being shipped as indicated by the advanced shipping notice 240, whereupon receipt of these items 204 at the site 209, the items 204 may be checked off the expected inventory database. In this manner, if an item 204 was not shipped or lost upon shipment, the computer program 150 may notify laboratory personnel 206 of this condition using information in the advanced shipping notice 240 in conjunction with the expected inventory database.

Upon transmitting the advanced shipping notice 240, the item 204 is then packaged in a tagged shipping carton 202 having an RFID tag 250, or an untagged shipping carton 203 which does not have any RFID tags on it. The shipping carton 202 or 203 is then provided to a package delivery service, such as FedEx™ or UPS™, and then delivered to the site 209. While in transit, the location of the shipping carton 202 or 203 may be tracked by the computer program 150 using a tracking number 204 provided in the advanced shipping notice 240. The computer program 150 can then provide the laboratory personnel 206 with an estimated date of delivery for the item 204. After items 204 begin to be received, they are checked against the advance shipping notice 240 and the line items from the purchase order 236 is closed. In this fashion, laboratory personnel 206 can keep track of which items 204 are still awaiting shipment or arrival.

Upon delivery of the shipping carton 202 or 203 by the delivery service at the site 209, the item 204 is received at the site 209 associated with the delivery location. The item 204 is preferably tagged and therefore includes an RFID tag 250. Preferably, the item 204 was tagged at the vendor's warehouse 208, however, if the item 204 is not tagged with an RFID tag 250, an RFID tag 250 may be placed on the item 204 at the site 209.

Preferably, upon receipt of the item 204 at the site 209, the item 204 enters a receiving room 214. Site 209 includes RFID portals 212, 222, 224, 226 having an embedded RFID antenna which receives signals having item information 252 transmitted by the RFID tag 250 on any tagged item 205 as the tagged item 205 passes through the RFID portals 212, 222, 224, 226. The RFID portals 212, 222, 224, 226 may be positioned at doorways, entrances, or exits to any room within the site 209, at doorways, entrances, or exits to the site 209, or at places near or on doorways or openings for machinery such a refrigerators or laboratory instruments 270 within the site 209. Preferably, as item 204 enters the receiving room 214, item 204 passes through a receiving room portal 222 which scans the RFID tag 250 and retrieves item information 252 from the tag 250. The item information 252 is then transmitted by the portal 222 to the computer program 150, whereby the inventory is updated by the computer program 150 to indicate that an additional item 240 has been received at the site 209. If the item 204 does not have a tag 250, then laboratory personnel 206 may generate a tag 250 using an RFID printer 228 and place the tag 250 on the item 204, and communicate item information 252 on the generated tag 250 to the computer program 150, such as by scanning the generated tag 250 with an RFID reader 260, passing the tagged item 205 through an RFID portal 212, 222, 224, 226, or manually entering and communicating the item information 252 on the generated tag 250 to the computer program 150.

Upon receiving the item 204 at the receiving room 214, tagging the item 204 to form a tagged item 205, and communicating item information 252 to the computer program 150, the tagged item 205 either remains in the receiving room 214 or the tagged item 205 is transferred to another area within the site 209, such as a storage room 216.

Storage room 216 may be a temperature-controlled or refrigerated storage room 217 where the temperature is maintained within a specific temperature range, or a non-temperature controlled or non-refrigerated storage room 218 where the temperature may fluctuate. Site 209 may include RFID antennas 220 dispersed throughout the site 209 in order to locate and preferably triangulate the signal generated by the RFID tag 250 so as to provide item location information 262, on the tagged item 205. Item location information 262 on the tagged item 205 may also be obtained via moving the tagged item 205 through RFID portals 212, 222, 224, 226 at the entrance or exit of certain rooms or areas within the site 209, in order to track and locate the tagged item 205.

When transferring the tagged item 205 from one part of the site 209 to another part of the site 209, the tagged item 205 may pass through any of the RFID portals 212, 222, 224, 226 located at an entryway of the site 209 or at entryways within the site 209. The portals 212, 222, 224, 226 retrieve item information 252 stored in the RFID tag 250 and transmit the item information 252 to the local computer 184, and specifically, the computer program 150.

At the local computer 184, the computer program 150 checks the item information 252 against the advance shipping notice 240 and information stored in an inventory database 230 connected with the computer program 150 in order to verify that the tagged item 205 is the same as the ordered item 204. Tagged items 205 which are the same as ordered items 204, are of the same type, the same manufacture and/or the same model number, and may also be of the same lot number and/or the same manufacturing date. Items 204 of the same type are items which have the same or similar composition but may be manufactured by different manufactures, such as with a generic versus a branded or non-generic product.

The inventory database 230 is connected with the computer program 150 and includes information about the amounts of each item 204, or tagged item 205, within the site 209. Preferably all items 204 in the site 209 are tagged items 205. If the tagged item 205 is the same as the ordered item 204, the tagged item 205 is preferably transferred to another location within the site 209, such as a long-term storage room 216 for storage within the site 209. The long-term storage room 216 may be a non-refrigerated storage room 217 or a refrigerated storage room 218. If the tagged item 205 is not the same as the ordered item 204, the tagged item 205 is returned to the vendor, preferably by requesting from the vendor, via the computer program 150, a Return Merchandise Authorization (RMA).

If the tagged item 205 is transferred to the long-term storage room 216, the tagged item 205 preferably passes near an RFID antenna 222 or an RFID reader 260 during transfer to the long-term storage room 216. Preferably, before or upon entry into the long-term storage room 216, the tagged item 205 passes through a storage room portal 224 having an embedded RFID antenna which receives signals having item information 252 transmitted by the RFID tag 250 on the tagged item 205. The item information 252 is then transmitted, along with preferably item location information 262, to the local computer 184 in order to track the location of the tagged item 205 within the site 209. Item location information 262 is any information which can provide an estimate of the location of the tagged item 205 within the site. Item location information 262 may be based on a signal strength of the signal transmitted from the RFID tag 250, and may be determined by at least one and preferably three RFID antennas 220. Item location information 262 may also simply be the location of the antenna 220 nearest the tagged item 205, or the location of the RFID portal 212, 222, 224, 226 through which the tagged item 205 has just passed through. In this manner, by providing item location information 262 to the local computer 184, and ultimately to the computer program 150, the computer program 150 is able to track the location of a tagged item 205 within the site 209.

The tagged item 205 may be transferred from the long-term storage room 216 to: another location within the site 209 such as a laboratory instrument 270; an additional destination 280 outside the site 209; or a disposal unit 290 within or outside the site 209. As the tagged item 205 is transferred, the tagged item 205 is passed near an RFID antenna 222 or an RFID reader 260 during transfer. Preferably, the before or upon transfer, the tagged item 205 passes through one of the RFID portals 212, 222, 224, 226 having an embedded RFID antenna which receives signals having item information 252 transmitted by the RFID tag 250 on the tagged item 205. The item information 252 is then transmitted, along with preferably item location information 262, to the local computer 184 in order to track the location of the tagged item 205 within the site 209 or to indicate that the tagged item 205 has left the site and gone to a disposal unit 290 or an additional destination 280. RFID antenna 220, RFID readers 260, and RFID portals 212, 222, 224, 226 may be used to track the tagged item 205's location through the site 209 or outside of the side 209 and then transmit item information 252, along with preferably item location information 262, to the local computer 184 in order to track the location of the tagged item 205 within or outside of the site 209.

In one embodiment, tagged items 205 which are transferred from one location to another location are checked against available items 204 in order to make a "best-pick" decision. A "best-pick" decision could be a recommendation by the computer program 150 to the laboratory personnel 206 that the retrieved item 205 is not the ideal choice for use. A reason for a "best-pick" recommendation may ensure that the retrieved item 205 is set to expire sooner than other tagged items 205 of a similar type therefore ensuring a first-in first-out (FIFO) usage. Another reason for a "best-pick" recommendation could be because another lot number associated with the retrieved item 205 is in use. Many times, instruments 270 need to be calibrated to the specific lot of the test. In these cases, it would be beneficial to the laboratory personnel 206 to continue using a single lot on an instrument 270 instead of switching between lots in order to avoid unnecessary calibration procedures. Another criterion that could be used to determine a "best-pick" decision could be based on the status of a tagged item 205 (i.e., Quarantined, Recalled, Ready-for-Use, etc).

Preferably, each location, such as the receiving room 214, each storage room 216, 217, 218, each instrument 270, each disposal unit 290, and any additional destination 280 has an RFID antenna 220, an RFID reader 260, and/or an RFID portal 212, 222, 224, 226 associated with the location in order to determine where the tagged item 205 is located and to generate or provide item location information 262, to the local computer 184 and the computer program 150 in order to track the location of the tagged item 205 within or outside of the site 209. Preferably, if a tagged item 205 is transferred to laboratory instrument 270 or disposal unit 290, item location information 262 is generated and transmitted to the local computer 184 and the computer program 150, where the tagged item 205 is then decremented from the inventory database 230, which is preferably maintained on the local computer 184 by the computer program 150 or is maintain on any computer in communication with the computer program 150.

In one embodiment, the local computer 184, and preferably the computer program 150, monitors the inventory database 230 in order to determine how many items 204 of a particular kind are in the site 209. Items 204 of a particular kind are items 204 which share some trait, such as items 204 which have the same manufacture, the same model number, same lot number, same manufacturing date, or are of the same type, such as when both are assays having the same or similar composition. If an amount of items 204 of a particular kind drops below a predetermined level, the computer program 150 may generate a purchase requisition 244 and display the purchase requisition 244 on a display in order to notify laboratory personnel 206 that a purchase order 236 needs to be generated for more items 204 of a particular kind. In one embodiment, the computer automatically monitor all items 204 and/or tagged 205 by received item information 252 stored on and transmitted by RFID tags 250 located on tagged items 205. Additionally, item information 252 may be manually entered by laboratory personnel 206 and communicated with computer program 150 and inventory database 230.

In one embodiment, the local computer 184, and specifically the computer program 150, monitors the inventory database 230 in order to determine how many items 204 of a particular kind are in the site 209. A purchase requisition 244 may be generated when an amount of items 204, and preferably tagged items 204, of a particular kind drops below a predetermined level in order to notify laboratory personnel 206 that a purchase order 236 needs to be generated for more items 204 of a particular kind. Upon generating the purchase requisition 244, the laboratory personnel 206 then may decide to generate purchase order 236 for more items 204 of a particular kind which then gets transmitted or communicated with the vendor, and specifically, the vendor warehouse 208 and/or the remote computer 182.

In one embodiment, the laboratory instrument 270 monitors an amount of a tagged item 205 of a particular kind, such as an amount of reagent. When the amount of the tagged item 205 of a particular kind drops below a predetermined level, a replenishment list 242 is generated in order to notify laboratory personnel 206 that additional tagged items of a particular kind need to be delivered to the laboratory instrument 270. Preferably the replenishment list 242 is generated by the laboratory instrument 270 and then transmitted to the local computer 184, and the computer program 150. Upon receiving the replenishment list 242, the computer program 150 generates a notification displayed on the display that notifies laboratory personal 206 that additional tagged items of a particular kind need to be delivered to the laboratory instrument 270.

Figure 6:
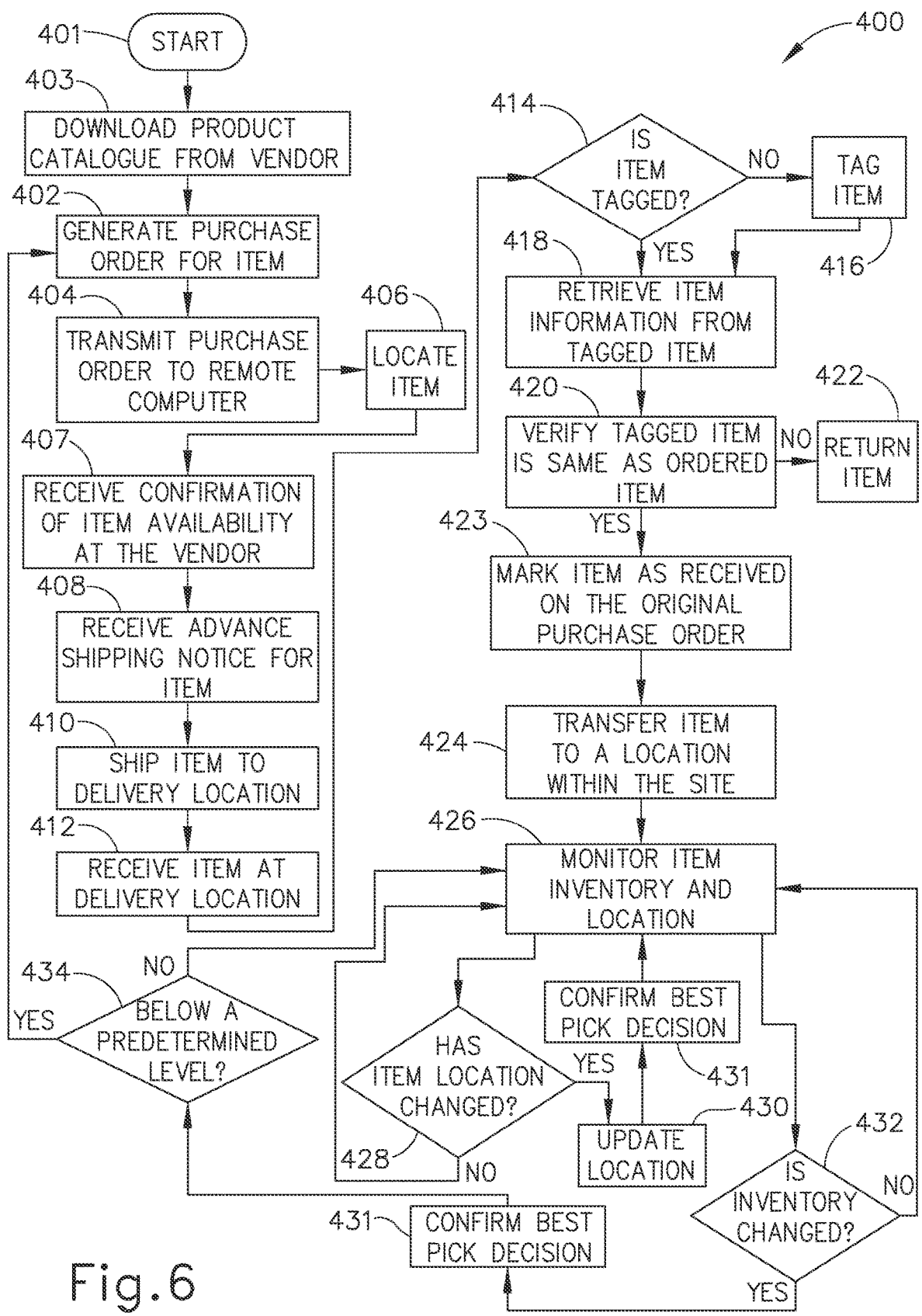
FIG. 6 depicts flowchart illustrations of methods, apparatus (systems) and computer program products, in accordance with one embodiment of the present invention.

With reference to FIG. 6, is a flowchart representation of a method 400 for automated laboratory inventory management which preferably track an amount of items 204 within a site 209 along with other information about the items 204, such as their location using item location information 262. Method 400 is initiated at block 401 by launching computer program 150 within a computer 100, such as local computer 184. Preferably, concurrent with the launching of computer program 150, laboratory inventory management application 153 is also launched which preferably resides as a program module 160 within the computer program 150. However, laboratory inventory management application 153 may be a separate computer program 150 which is not embedded within another computer program 150 or which is launched concurrently with another computer program 150.

Moving to block 402, upon launching the computer program 150, if an amount of an item 204 of a particular kind drops below a predetermined level, the computer program 150 may automatically generate a purchase requisition 244 in order to notify laboratory personnel 206 that a purchase order 236 needs to be generated for more items 204 of a particular kind. Preferably, before the item 204 is ordered or a purchase requisition is generated, a product catalogue 234 is received from a remote computer 182 at a vender's warehouse 208 detailing the item 204 at block 403. Upon viewing the purchase requisition 244 and deciding that a purchase order 236 needs to be generated for more items 204 of a particular kind, a purchase order 236 is generated for the item 204 using the local computer 184, wherein the purchase order 236 specifies a delivery location. The purchase order 236 may be generated automatically by the computer program or manually by laboratory personnel 206. Upon generating the purchase order 236, the method 400 moves to block 404 where the purchase order 236 is transmitted to the remote computer 182 in order to communicate the purchase order 236 to a vendor. The remote computer 182 transmits the purchase order 236 to and/or notifies the vendor of the purchase order 236, whereupon the vendor locates any and/or all items 204 listed on the purchase order 236 at block 406. Upon locating any and/or all items 204 listed on the purchase order 236, the vendor receives confirmation of the availability of any and/or all items 204 listed on the purchase order 236 at block 407.

Moving to block 408, upon locating any and/or all items 204 listed on the purchase order 236, the vendor generates and transmits an advance shipping notice 240 to the local computer 184 whereupon the local computer receives the advance shipping notice 240 for the ordered item 204. Upon generating and transmitting the advance shipping notice 240, at block 410, the item 204 is shipped to the delivery location, which is preferably the site 209 at which the purchase order 236 was generated.

Moving to block 412, the ordered item 204 is received at the delivery location and then at block 414 it is determined if the ordered item 204 is tagged or not, that is, if the item 204 has an RFID tag 250 affixed to the item 204 or not. If the item 204 is tagged, it is considered a tagged item 205, and then item information 252 is retrieved from the tagged item 205, and particularly, from the RFID tag 250 affixed to the tagged item 205. If the item 204 is not tagged, then the item 204 is tagged at block 416 by affixing an RFID tag 250 to the item 204 and then moving back to block 414.

Upon retrieving item information 252 from the tagged item 205, the method 400 moves to block 420 where it is verified that the tagged item 205 is the same as the ordered item 204. If the tagged item 205 is not the same as the ordered item 204, then at block 422 the tagged item 205 is returned back to the manufacturer for the ordered item 205 and an RMA is requested, for example. If the tagged item 205 is the same as the ordered item 204, then the method 400 moves to block 423, where the tagged item 205 is marked as received on the original purchase order 236 and then the method moves to block 424 where the tagged item 205 is transferred to a location within the site 209.

Moving to block 426, the computer program 150 then monitors the inventory of tagged items 205 and untagged items 204, if any, along with the location of all the items 204, 205 within the site 209. Preferably, all items 204 within the site are tagged items 205. The computer program 150 periodically automatically receives item information 252 along with item location information 262 from a tagged item 205 as the tagged item 205 goes through an RFID portal 212, 222, 224, 226, nears an RFID antenna 220, or is scanned by an RFID reader 260. Using the item information 252 and the item location information 262, the computer program 150 is able to monitor the inventory of tagged items 205 along with the location of all the items 205 within the site 209. The item information 252 and the item location information 262 may be manually sent to the computer program 150 as well for untagged items 204 using laboratory personnel 206 who manually enter this information and transmit it to the computer program 150.

Moving to block 428, upon receiving the item location information 262 for a particular item 204, 205, the computer program 150 then determines if the location of the particular item 204, 205 has changed. If the location has changes, then the location is updated in the inventory database 230 at block 430, a "best pick" decision is made by the computer program and confirmed by the user at block 431 and then the method moves back to block 426. If the location has not changed then the method 400 goes back to block 426.

Moving to block 432, upon receiving the item information 252 for a particular item 204, 205, the computer program 150 then determines if the any information about the particular item 204, 205 has changed and if so updates that information in the inventory database 230 and moves to block 431 where the computer program makes a "best pick" decision which is then confirmed by the user. Additionally, if item information 252 is no longer present for a particular item 204, 205, or if the item location information 262 indicates that the item 204, 205 has been disposed of such as by being in the disposal unit 290, or if a message is transmitted to the computer program 150 from laboratory personnel 206 or machinery within the site 209 such as laboratory instrument 270, then the computer program 150 updates the inventory or amount of the particular kind of item 204, 205 which is left in the site 209. Moving to block 434, it is determined if the inventory or amount of the particular kind of item 204, 205 falls below a predetermined level. If the inventory or amount of the particular kind of item 204, 205 does not fall below a predetermined level, the method moves back to block 426, if the inventory or amount of the particular kind of item 204, 205 does falls below a predetermined level, then the method 400 moves to block 402 wherein the computer program generates a purchase requisition 244 and then a purchase order 236 is generated from the purchase requisition 244.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSIs), or other integrated formats.

However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

What is claimed is:

1. A system to manage an inventory of laboratory items in a laboratory, the system comprising:
   a radio frequency identification (RFID) antenna located in the laboratory, the laboratory items having RFID tags storing item information associated with respective ones of the laboratory items, the laboratory items being a same type of laboratory item, the RFID antenna to scan the RFID tags when in range of the RFID antenna to obtain the item information from the corresponding ones of the RFID tags;
   an RFID reader to be used to scan the RFID tags on the laboratory items to obtain the item information from the corresponding ones of the RFID tags; and
   memory including instructions to cause a computer to:

track locations of the laboratory items in the laboratory based on scans of the RFID tags by at least one of the RFID antenna or the RFID reader;

determine an amount of the laboratory items remaining in the laboratory based on scans of the RFID tags by at least one of the RFID antenna or the RFID reader;

store the amount of the laboratory items remaining in the laboratory in an inventory database;

in response to determining the amount of the laboratory items remaining in the laboratory is below a threshold amount, generate a purchase order for additional ones of the laboratory items;

identify, based on a scan by at least one of the RFID antenna or the RFID reader, a selection of a first one of the laboratory items to be used in a laboratory instrument;

determine a second one of the laboratory items having a same lot number as a laboratory item already in use by the laboratory instrument; and generate a recommendation to select the second one of the laboratory items to be used in the laboratory instrument in place of the first one of the laboratory items.

2. The system of claim 1, wherein the instructions are to cause the computer to decrement the amount of the laboratory items in the inventory database based on a determination that at least one of the laboratory items is transferred to a laboratory instrument in the laboratory or a disposal unit in the laboratory.

3. The system of claim 1, wherein the instructions are to cause the computer to automatically transmit the purchase order to a vendor to purchase the additional ones of the laboratory items.

4. The system of claim 1, wherein the RFID antenna is adjacent a refrigerated storage room in the laboratory.

5. The system of claim 1, wherein the RFID antenna is installed on a ceiling in the laboratory.

6. The system of claim 1, wherein the laboratory items are reagents to be used in a laboratory instrument.

7. The system of claim 6, wherein the RFID reader is a first RFID reader, the system further including a second RFID reader associated with the laboratory instrument.

8. The system of claim 1, wherein the item information includes at least one of a serial number, a lot number, a manufacturing date, an expiration date, a recommended storage temperature, contents, ingredients, a part number, or an estimate shipping date of the corresponding laboratory item.

9. The system of claim 1, wherein the instructions are to cause the computer to, in response to receipt of a replenishment list from a laboratory instrument, issue a notification to provide more of the laboratory items to the laboratory instrument.

10. A non-transitory computer readable medium comprising instructions that are to cause programmable circuitry to at least:

track locations of laboratory items in a laboratory based on scans of radio frequency identification (RFID) tags on the laboratory items by at least one of an RFID antenna or an RFID reader, the RFID antenna installed in a fixed location in the laboratory;

determine an amount of the laboratory items remaining in the laboratory based on the scans of the RFID tags by at least one of the RFID antenna or the RFID reader;

store the amount of the laboratory items remaining in the laboratory in an inventory database;

in response to determining the amount of the laboratory items remaining in the laboratory is below a threshold amount, generate a purchase order for additional ones of the laboratory items;

identify a first one of the laboratory items selected by a laboratory operator to be used by a laboratory instrument based on a scan by at least one of the RFID antenna or the RFID reader;

determine an expiration date of the first one of the laboratory items is later than a second one of the laboratory items; and generate an order to select the second one of the laboratory items to be used in the laboratory instrument in place of the first one of the laboratory items.

11. The non-transitory computer readable medium of claim 10, wherein the RFID antenna is located adjacent a disposal unit in the laboratory, and wherein the instructions, when executed, cause the computer to decrement the amount of the laboratory items in the inventory database based on a determination that at least one of the laboratory items is transferred to the disposal unit.

12. The non-transitory computer readable medium of claim 10, wherein the instructions are to cause the programmable circuitry to automatically transmit the purchase order to a vendor to purchase the additional ones of the laboratory items.

13. The non-transitory computer readable medium of claim 12, wherein the instructions are to cause the programmable circuitry to:

access an advanced shipping notice from the vendor, the advanced shipping notice generated prior to shipping the additional ones of the laboratory items from the vendor to the laboratory;

obtain new item information from RFID tags from a set of laboratory items received at the laboratory; and compare the new item information to the advanced shipping notice to verify the set of laboratory items is the same as the additional ones of the laboratory items in the purchase order.

14. The non-transitory computer readable medium of claim 10, wherein the instructions are to cause the programmable circuitry to, prior to generating the purchase order, download and search a product catalogue from a vendor.

15. A system to manage an inventory of laboratory items in a laboratory, the system comprising:

a radio frequency identification (RFID) reader to be used by a laboratory person to scan RFID tags on the laboratory items received at the laboratory;

an RFID antenna installed in the laboratory adjacent a disposal unit in the laboratory, the RFID antenna to scan the RFID tags of the corresponding laboratory items that are transferred to the disposal unit;

instructions; and a processor to execute the instructions to:

identify a transfer of a first one of the laboratory items from a storage room to a laboratory instrument based on a scan by at least one of the RFID reader or the RFID antenna;

determine a first lot number of the first one of the laboratory items is different than an item already in use by the laboratory instrument while a second lot number of a second one of the laboratory items in the storage room is the same as the item already in use by the laboratory instrument; and generate a recommendation for the laboratory person to select the second one of the laboratory items to be used in the laboratory instrument in place of the first one of the laboratory items.

16. The system of claim 15, wherein the processor is to execute the instructions to:
determine an amount of the laboratory items remaining in the laboratory;
store the amount in an inventory database;
determine the second one of the laboratory items is being transferred to the laboratory instrument; and
decrement the amount of the laboratory items the inventory database based on the determination that the second one of the laboratory items is being transferred to the laboratory instrument.

17. The system of claim 16, wherein the processor is to execute the instructions to:
compare the amount of the laboratory items to a threshold; and
generate a purchase order for additional laboratory items in response to the amount of laboratory items being below the threshold.

18. The system of claim 17, wherein the processor is to execute the instructions to automatically transmit the purchase order to a vendor.

19. The system of claim 16, wherein the laboratory items are reagents, assays, calibrators, or controls.

* * * * *